(12) United States Patent
Goshen

(10) Patent No.: US 11,681,693 B2
(45) Date of Patent: *Jun. 20, 2023

(54) DATABASE INTERFACE METHOD AND SYSTEM

(71) Applicant: Hexagon Technology Center GmbH, Heerbrugg (CH)

(72) Inventor: Doron Goshen, Nahariya (IL)

(73) Assignee: Hexagon Technology Center GmbH, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,822

(22) Filed: Aug. 5, 2021

(65) Prior Publication Data

US 2022/0027360 A1    Jan. 27, 2022

Related U.S. Application Data

(63) Continuation of application No. 14/724,146, filed on May 28, 2015, now Pat. No. 11,086,854.

(60) Provisional application No. 62/005,255, filed on May 30, 2014.

(51) Int. Cl.
   *G06F 16/24* (2019.01)
   *G06F 16/242* (2019.01)
   *G06F 16/248* (2019.01)

(52) U.S. Cl.
   CPC ........ *G06F 16/2423* (2019.01); *G06F 16/248* (2019.01)

(58) Field of Classification Search
   None
   See application file for complete search history.

(56) References Cited

U.S. PATENT DOCUMENTS

| 5,615,367 | A | * | 3/1997 | Bennett | G06F 16/252 |
|---|---|---|---|---|---|
| | | | | | 707/999.102 |
| 8,726,177 | B2 | * | 5/2014 | Zeringue | G06F 3/0481 |
| | | | | | 715/835 |
| 2001/0016843 | A1 | * | 8/2001 | Olson | G06F 16/245 |
| 2002/0083052 | A1 | * | 6/2002 | Heuer | G06F 16/30 |
| 2012/0197864 | A1 | * | 8/2012 | Bourdoncle | G06F 16/2428 |
| | | | | | 707/711 |
| 2013/0086097 | A1 | * | 4/2013 | Teichmann | G06F 16/24534 |
| | | | | | 707/E17.014 |

OTHER PUBLICATIONS

Gabriel Black; The gem5 Simulator; ACM; 2011; pp. 1-7 (Year: 2011).*

* cited by examiner

*Primary Examiner* — Albert M Phillips, III
*Assistant Examiner* — Jermaine Mincey
(74) *Attorney, Agent, or Firm* — Nutter McClennen & Fish LLP

(57) ABSTRACT

An intuitive interface that allows a non-technical person to search a computer database without having to understand the underlining database software or its structure by assembling a graphical database query.

12 Claims, 16 Drawing Sheets

```
SELECT DISTINCT
COMPONENT_2.CMPNT_NAME AS "Instrument_Name",
COMPONENT_2.CMPNT_ID AS "CMPNT_ID",
SPEC_SHEET_DATA_3 AS "SPEC_FORM_ID",
SPEC_SHEET_DATA_3 AS "DWG_ID",
SPEC_SHEET_DATA_3 AS "CMPNT_ID",
SPEC_SHEET_DATA_3 AS "CASE_ID",
PD_GENERAL_4.CMPNT_ID AS "CMPNT_ID2",
PD_GENERAL_4.LINE_ID AS "LINE_ID",
PD_GENERAL_4.EQUIP_ID AS "EQUIP_ID",
PD_GENERAL_4.PD_STAT AS "PD_STAT",
PD_GENERAL_4.CASE_ID AS "CASE_ID1",
FLOW_14.CMPNT_ID AS "CMPNT_ID3",
FLOW_14.PD_STAT AS "PD_STAT1",
FLOW_14.CASE_ID AS "CASE_ID2",
DRAWING_EXTERNAL_BLOCK_8.DWG_EXTERNAL_BLK AS "DWG_EXTERNAL_BLK_ID",
LOOP_9.LOOP_ID AS "LOOP_ID",
DRAWING_13.DWG_ID AS "DWG_ID",
DRAWING_16.DWG_NAME AS "DWG_TGI",
DRAWING_17.DWG_NAME AS "Specification",
DRAWING_EXTERNAL_BLOCK_8.DWG_EXTERNAL_BLK_NAME AS "CAD Block Drawing",
LOOP_9.LOOP_ID AS :LOOP Name:
DRAWING_13.DWG_NAME AS "Loop_Drawing"
DRAWING_18.DWG_NAME AS "Flow_Calculation"
FROM
COMPONENT_COMPONENT_4
INNER JOIN PD_GENERAL PD_GENERAL_1 ON COMPONENT_2.CMPNT_ID = PD_GENERAL.1CMPNT_ID AND PD_GENERAL_1.GOVERNING_CASE = 1
INNER JOIN SPEC_SHEET_DATA SPEC_SHEET_DATA_3 ON PD_GENERAL_1.CMPNT_ID = SPEC_SHEET_DATA3.CMPNT_ID AND PD_GENERAL_1.CASE_ID = SPEC_SHEET_DATA3_3.CASE_ID AND PD_GENERAL_1.GOVERNING_CASE = 1
LEFT JOIN DRAWING DRAWING_16 ON SPEC_SHEET_DATA_3.DWG_ID = DRAWING_16.DWG_ID
INNER JOIN PD_GENERAL PD_GENERAL_4 ON COMPONENT_2.CMPNT_ID = PD_GENERAL_4.CMPNT_ID AND PD_GENERAL_4.GOVERNING_CASE = 1
INNER JOIN FLOW FLOW_14 ON PD_GENERAL_4.CMPNT_ID = FLOW_14.CMPNT_ID AND PD_GENERAL_4.CASE_ID = FLOW_14.CASE_ID AND PD_GENERAL_4.PD_GEN_ID = FLOW_14.PD_GEN_ID AND PD_GENERAL_4.GOVERNING_CASE = 1
LEFT JOIN DRAWING DRAWING_18 ON FLOW_14.DWG_ID = DRAWING_18.DWG_ID
INNER JOIN COMPONENT_DWG_EXTERNAL_BLOCK COMPONENT_DWG_EXTERNAL_BLOCK_6 ON COMPONENT_2.CMPNT_ID = COMPONENT_DWG_EXTERNAL_BLOCK_6.CMPNT_ID
INNER JOIN DRAWING_EXTERNAL_BLOCK DRAWING_EXTERNAL_BLOCK_8 ON COMPONENT_DWG_EXTERNAL_BLOCK_6.DWG_EXTERNAL_BLK_ID = DRAWING_EXTERNAL_BLOCK_8.DWG_EXTERNAL_BLK_ID
INNER JOIN LOOP LOOP_9 ON COMPONENT_2.LOOP_ID = LOOP_9.LOOP_ID
INNER JOIN LOOP_DRAWING LOOP_DRAWING_11 ON LOOP_9.LOOP_ID = LOOP_DRAWING_11.LOOP_ID
INNER JOIN DRAWING DRAWING_13 ON LOOP_DRAWING_11.DWG_ID = DRAWING_13.DWG_ID AND DRAWING_13.DWG_TYPE_ID = 2
WHERE
( (COMPONENT_2.CMPNT_ID > 0) )
ORDER BY SUBSTRING(DRAWING_16.DWG_NAME,2,3) ASC
```

*FIG. 10*

DATABASE INTERFACE METHOD AND SYSTEM

RELATED APPLICATIONS

The present application is a continuation of, and therefore claims priority from, U.S. patent application Ser. No. 14/724,146 entitled Database Interface Method and System filed May 28, 2015 (U.S. Pat. No. 11,086,854), which claims priority from U.S. provisional application Ser. No. 62/005,255 entitled Database Interface Method and System filed May 30, 2014, naming Doron Goshen as inventor. Each of the foregoing applications is hereby incorporated herein by reference in its entirety.

TECHNICAL FIELD

The present invention relates to databases, and more particularly to forming queries for searching databases.

BACKGROUND ART

It is known in the prior art to search a relational database by entering text (characters and/or digits) into one or more fields of a database management system ("DBMS"). A DBMS is a database program that uses a standard method of cataloging, retrieving, and running queries on data. Examples of DBMSs include: MySQL, PostgreSQL, Microsoft SQL Server, Oracle, Sybase and IBM DB2. The DBMS manages incoming data, organizes the data, and provides ways the data to be modified or extracted by users or other programs. A DBMS provides a query language and report writer that lets users interactively interrogate the relational database. These essential components give users access to all management information as needed. The DBMS applies entered text to the database as criteria to identify and report records in the database that meet the criteria. Entering the text into the fields of the DBMS requires the user to have an understanding of the DBMS and how the DBMS represents the data in the database. For example, for a given search term, the user must know which field in DBMS is appropriate for searching that term. For a search query with multiple search terms, the user must be familiar with multiple fields in the DBMS, and how those fields will interact to limit or otherwise define a search. Similarly, the user must know the hierarchical structure between database tables and the keys for linking the tables together.

In addition, in the prior art, the user must be familiar with the DBMS unique search\query syntax and cannot reuse it with different DBMS providers, and therefore the user must be well versed in different terminologies for different DBMS systems to recreate his search\query multiple times for each DBMS provider.

SUMMARY OF THE EMBODIMENTS

In accordance with one embodiment of the invention, a computer-implemented method for automatically constructing a database query for a database management system is disclosed. The database management system includes a query syntax and the resulting database query constructed in the database management system query syntax. The database management system includes a plurality of database tables containing database entries.

First, a user is provided with a user interface allowing the user to select logical objects and properties of logical objects and to join two or more logical objects together using a predefined joining logic within a graphical computer workspace to form a graphical query. In such a methodology, the underlying database structure including the physical level of the database table names, field names, and the keys between database tables are unknown to the user.

Based on the graphical query a translation module receives a listing of logical objects, the selected properties of the logical objects, and a representation of the joining logic between logical objects. The received information is passed from the graphical user interface to the translation module. The translation module associates each logical object with one or more corresponding database tables in accordance with a data dictionary that relates logical objects with the database tables wherein at least one of the logical objects is associated with a plurality of database tables. The translation module also arranges the logical objects in a hierarchical order based on the selected properties for the logical objects using the data dictionary and joins the associated logical objects to form a query structure of the database tables and keys for the database tables wherein the database tables are joined together in accordance with the joining logic as specified by the user in the graphical query. The transformation module then transforms the query structure into a database query for a specified database management system wherein the database query uses the database management system query syntax. Since the query structure is agnostic of any database management system syntax, the query structure can be saved, recalled, and transformed in accordance with the query syntax of any database management system.

In some embodiments of the invention, the resulting database query uses the standard structured query language (SQL). In other embodiments of the invention, the database query is a script that can be provided to a database management system for performing the graphical query. One form of the query structure is a tree structure that relates the database tables, database keys, and the type of joining command between database tables. The tree structure also provides the databases in a hierarchy such that a search can be generated based on the hierarchy that will correspond to the graphical query.

In certain embodiments of the invention, the database query may be executed using a database management system to produce results and the results may be saved to memory, displayed on a display device or both.

In embodiments of the invention, the data dictionary includes a plurality of levels including a physical level and a logical level, wherein the physical level associates DBMS database structures with a data dictionary structure and the logical level associates the data dictionary structure with logical objects that can be graphically selected by a user.

BRIEF DESCRIPTION OF THE DRAWINGS

The foregoing features of embodiments will be more readily understood by reference to the following detailed description, taken with reference to the accompanying drawings, in which:

FIGS. 1A-1E schematically illustrate a graphical database query and features of building a database query in accordance with embodiments of the invention, where FIG. 1A show a graphical user interface for graphically creating a database query from a menu of icons, FIG. 1B shows an alternate embodiment of a menu of icons for graphically creating a database query, FIG. 1C schematically shows an instrument being coupled to a panel through a relationship using a connector, FIG. 1D shows an exemplary connector menu for selection of a relationship between icons, and FIG. 1E schematically shows an exemplary operation box providing a user with options for configuring the relationship as illustrated by the connector;

FIG. 4 schematically illustrates an output of a database search in accordance with an embodiment of the invention;

FIG. 10 provides an exemplary script that is generated from the tree structure using techniques known in the art.

DETAILED DESCRIPTION OF SPECIFIC EMBODIMENTS

Various embodiments provide an intuitive interface that allows a non-technical person to search a computer database without having to understand the underlining database software or its structure.

The term "item" as used in the present application shall refer to an object that is a logical abstraction of elements from a plurality of tables in a relational database. An item may be a real-world physical object such as an engineering element, or a part of a larger structure that can have one or more associated properties; the term logical object may also refer to an item and may be used interchangeably unless the context dictates otherwise.

The term "key" will be used in its normal relational database usage to represent a linkage between database tables in a database. Keys can ensure that each record within a table can be uniquely identified by a field or combination of fields within a table. It should be recognized that here are different key types including candidate keys, primary keys and foreign keys.

The term "join" shall be understood to apply to a "join" command as used in the database arts. For example, an SQL join command combines records from two or more tables in a relational database. There may be different types of join commands, which can be referred to as different filters. For example, in SQL there are five different join filters: inner join, left outer join or left join, right outer or right join, full outer join and cross join.

Figure 1A:
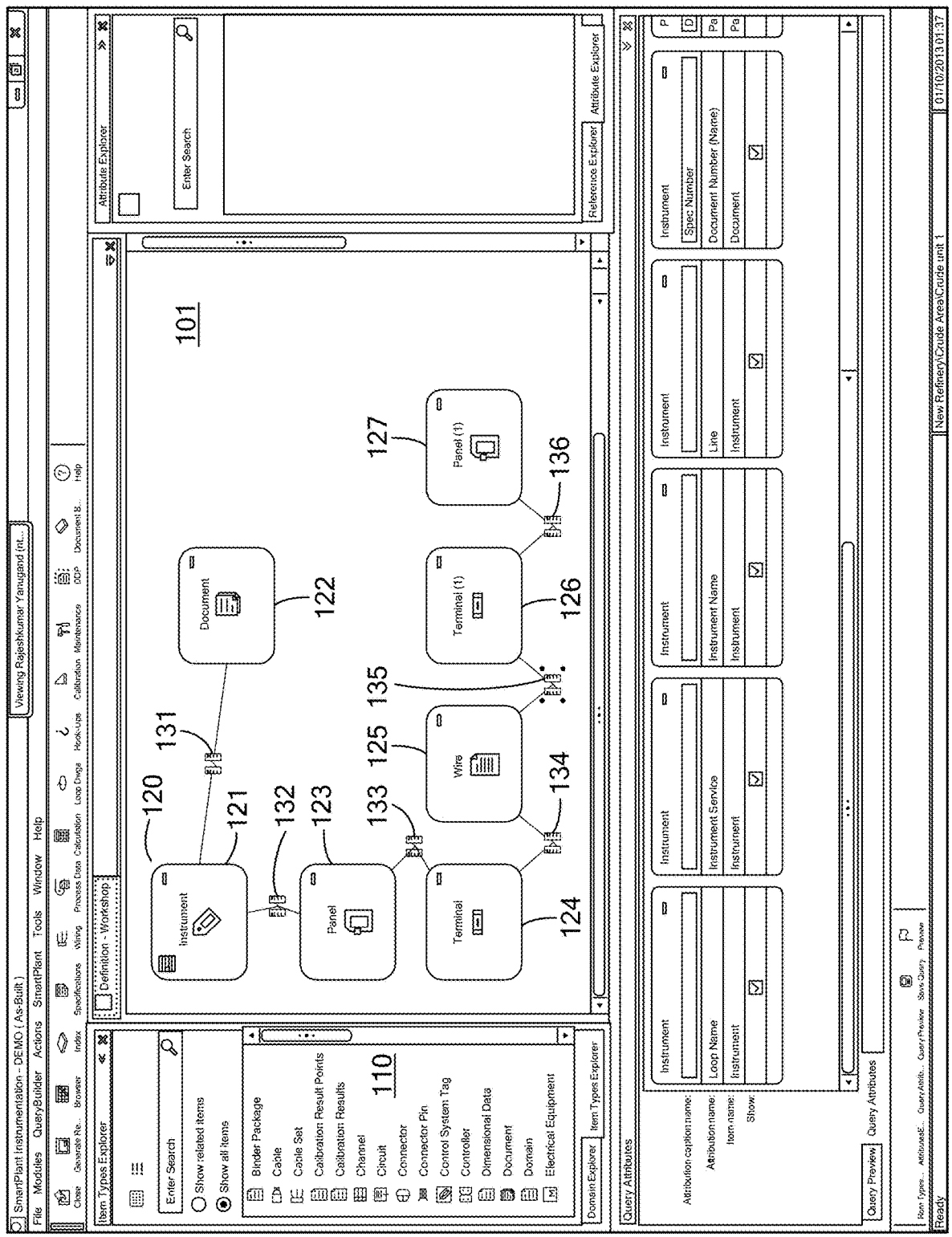

FIG. 1A schematically illustrates a graphical database query 120. Prior art text-based database queries require a user to understand the particular terminology and structure of the database and do not provide for abstractions of objects that may be defined because of the database tables.

In contrast, a user can create graphical query 120 using an intuitive graphical user interface and well-known computer features, such as using a mouse.

Figure 2:
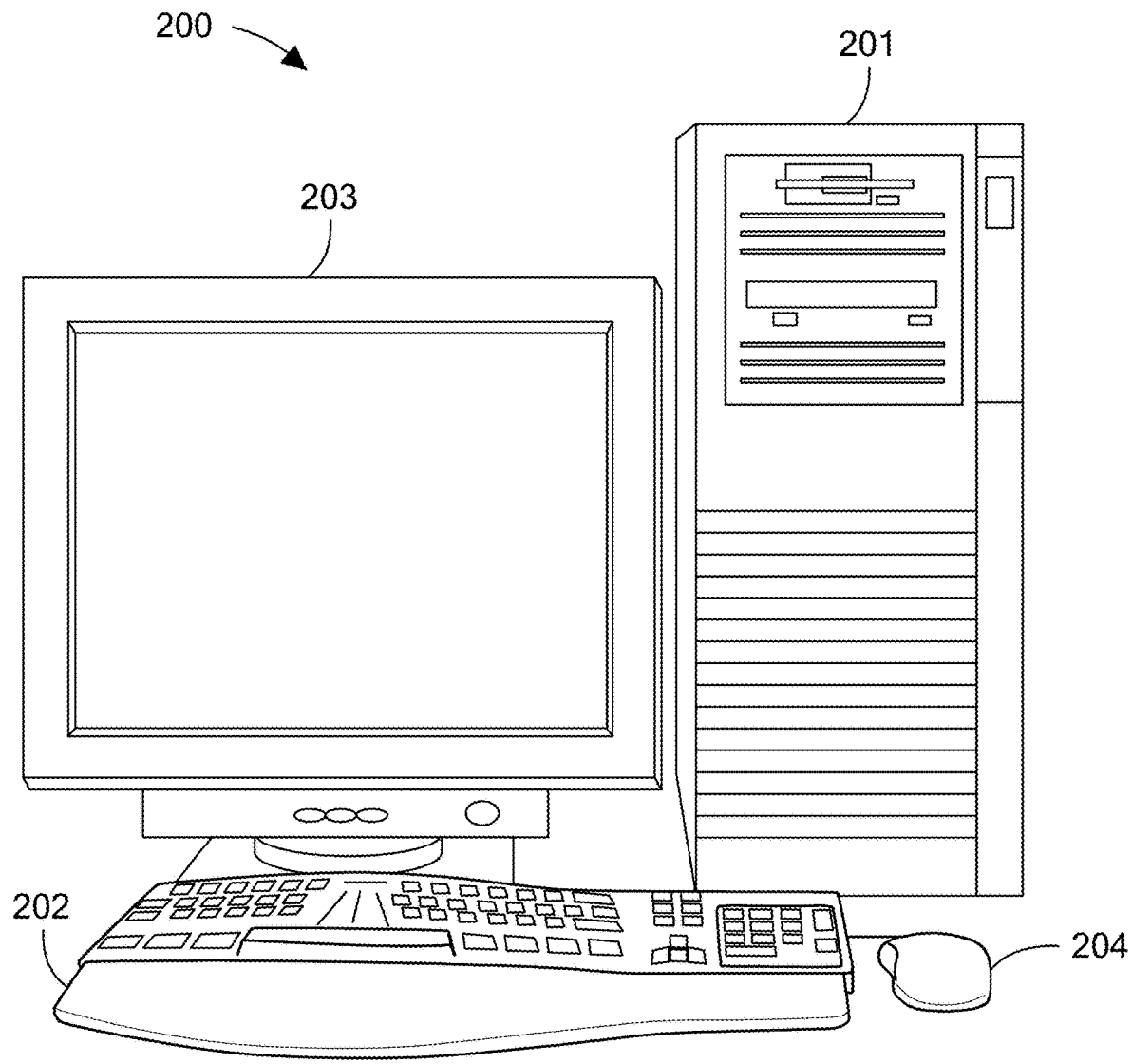
FIG. 2 schematically illustrates a graphical database computer in accordance with an embodiment of the invention.

Illustrative embodiments may be implemented on a computer, such as computer 200 in FIG. 2. The computer 200 includes a CPU 201, a keyboard 202, and a monitor or image display device 203. The CPU 201 may include both dynamic memory and static memory, such as a hard disk drive, for example. The CPU also includes a microprocessor in communication with the memory and/or disk drive, and is configured to execute instructions stored in the memory and/or disk drive. To that end, the memory, the disk drive, or both, may be configured to be non-transient and to store executable computer instructions indefinitely. The instructions, when executed by the microprocessor, may implement some or all of the operations and actions described herein. The CPU may also include a communications interface configured to communicate with other systems to execute the operations and actions described herein. The computer 200 also includes a mouse 204, as commonly known. Embodiments of the invention may be implemented in a network environment wherein one or more of the modules of the invention are associated with different processors.

Figure 3:
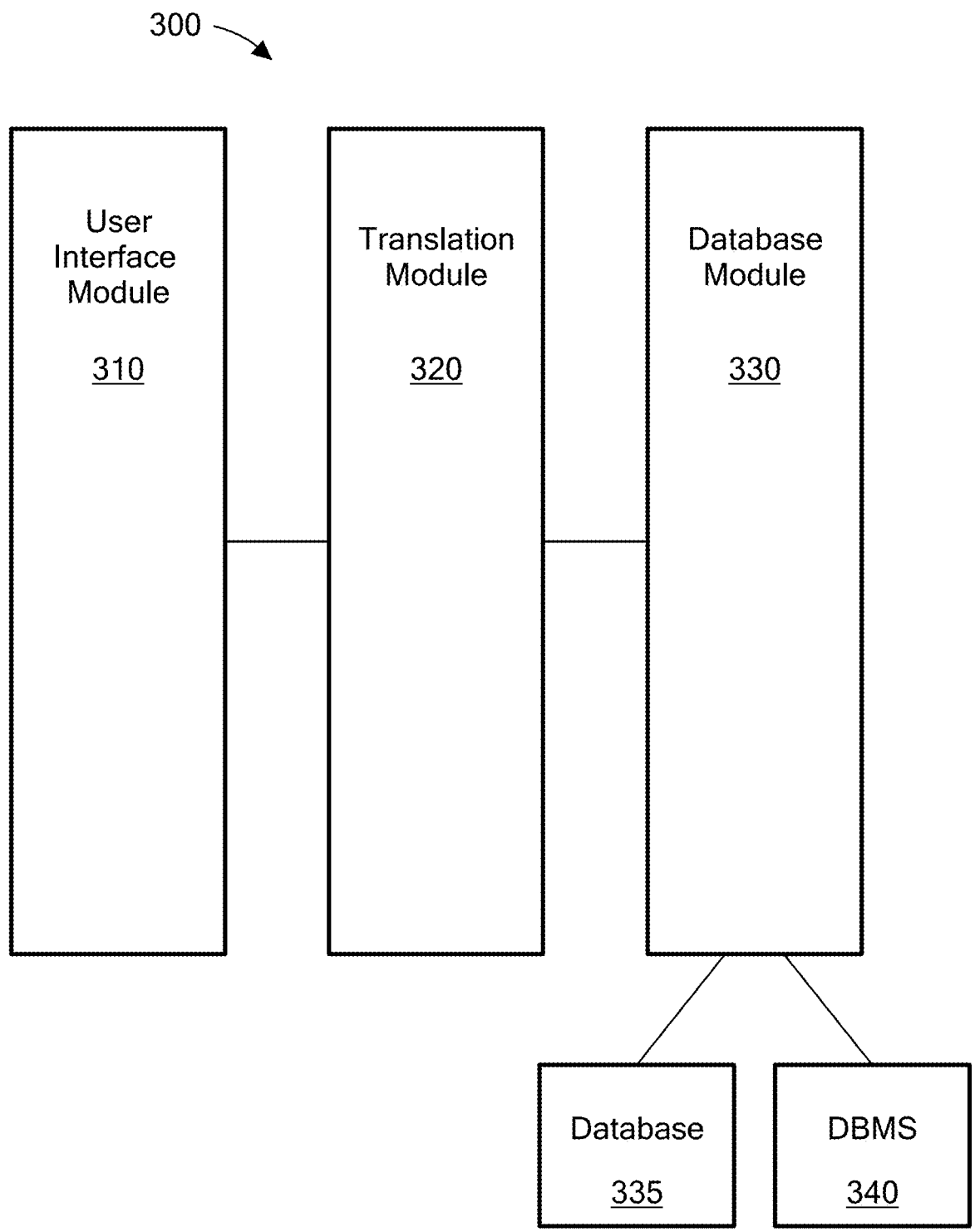
FIG. 3 schematically illustrates a graphical database system in accordance with an embodiment of the invention.
Figure 5:
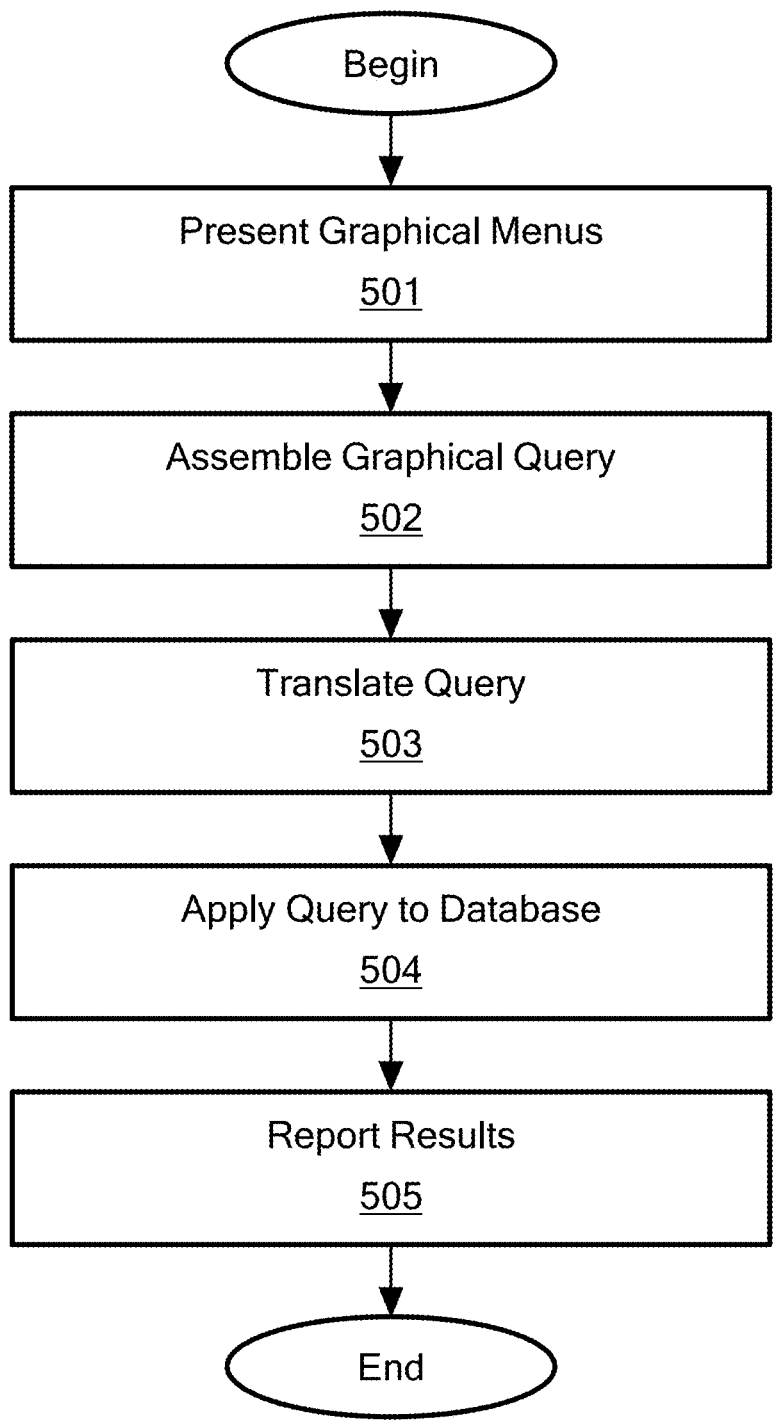
FIG. 5 schematically illustrates a flow chart in accordance with an embodiment of the invention.

FIG. 3 schematically illustrates a system 300 for interfacing to a database according to an illustrative embodiment. FIG. 5 is a flow chart of a method 500 that can be executed by a system such as system 300. The system 300 and method 500 are described below, and in connection with FIGS. 1A-1E.

The system 300 includes a graphical user interface module 310, and a translation module 320. The translation module 320 is logically disposed between the graphical user interface module 310 and a database module 330. The database module 330 includes a database 335, and may also include a DBMS 340. It should be recognized that the present invention sits above the DBMS and interfaces with the DBMS by providing queries in a format that is compatible with the DBMS system. For example, if a DBMS system is designed to understand the SQL (structured query language) standard, the present invention may provide as input to the DBMS a structured query, such as in the form of a script. Additionally, the query may be configured to the specific syntax for the given DBMS. It is known in the art that different DBMSs may include proprietary syntax and therefore, embodiments of the present invention provide a mechanism for constructing a graphical query, identifying the relationships between the items in the graphical query and the underlying tables and keys of the database, and placing the relationships in an agnostic format that can be translated into the query syntax for a specified DBMS.

The graphical user interface module 310 is configured to display, for example on an image display device, a plurality of graphical items usable by a user to define a graphical interface query, such as query 120 for example as shown in the workspace 101 of FIG. 1A.

Figure 1B:
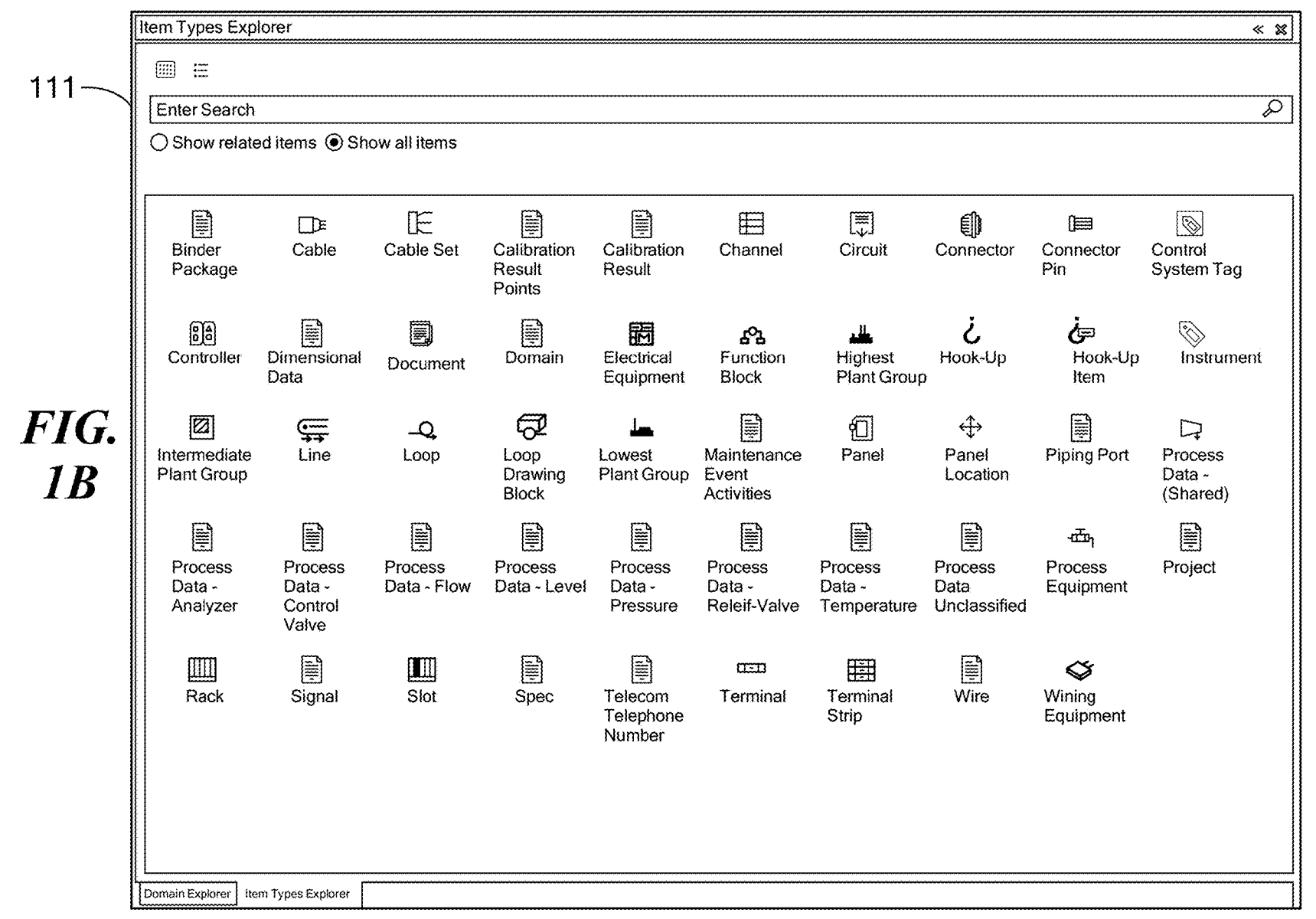

The graphical user interface module 310 displays a library of icons (also known as "item types"), each of which represents a logical object, which is an abstraction of elements from one or more database tables. In FIG. 1A, for example, a menu of icons 110 is displayed on the left side of a screen of an image display device. An alternate embodiment of a menu 111 of such icons is schematically illustrated in FIG. 1B. The icons, either alone or interconnected in a tree, do not contain code segments to be concatenated or compiled into a program, as in object-oriented programming. Rather, each icon represents a logical object that can be translated into a database query using a data dictionary that relates the logical object to the underlying structure of the database of the DBMS system.

The graphical user interface module 310 also displays menus of graphical connectors within the workspace 101, each configured to couple a pair of icons displayed by the image display device. The graphical connectors represent relational methods, and may include or be associated with code that, when executed, provides a user options for defining the function of the connector.

An illustrative example of the operation of a graphical user interface module 310 and a translation module 320 is described below, in connection with flow chart 500 in FIG. 5. In this example, a database module 330 includes a database associated with a construction project for a manufacturing plant. Various components of the plant, and information about such components, are recorded in the database. For example, one class of components may be known as "Instruments," while another class of components may be known as "Panels." Information about each component is stored in a record (or "row") uniquely associated with that component. Each record has several "fields," and each field stores an item of data about the component to which that record applies. For example, a given instrument may be able to interface to a specific type of panel, and a give panel. As such, the record for that instrument would have a field named "Instrument—Device Panel*" (or "I-DP") for storing information to identify the type of panel to which the instrument can interface. Similarly, the record for each panel would have a field named "Device Panel—Instrument*" (or "DP-I") for storing information to identify the instrument to which that panel can interface. A user may wish to retrieve, from the database, a listing of all instruments, a listing of all panels, or a listing of all instruments and panels that can interface to one another, or some combination thereof. It should be recognized by one of ordinary skill in the art that the present invention is no limited to construction projects for manufacturing plants, but rather is generally applicable to hierarchical databases that have data that is representative of items wherein an item may have relationships between a plurality of databases. Thus, an item may be a logical construct that relates together a plurality of database elements from a plurality of databases.

In the present example, the user of the database may be, for example, a construction manager who wants to assess the status of the installation of one or more items. The system 300 is stored on, and operates on, a computer, such as computer 200, for example.

Step 501

Figure 1C:
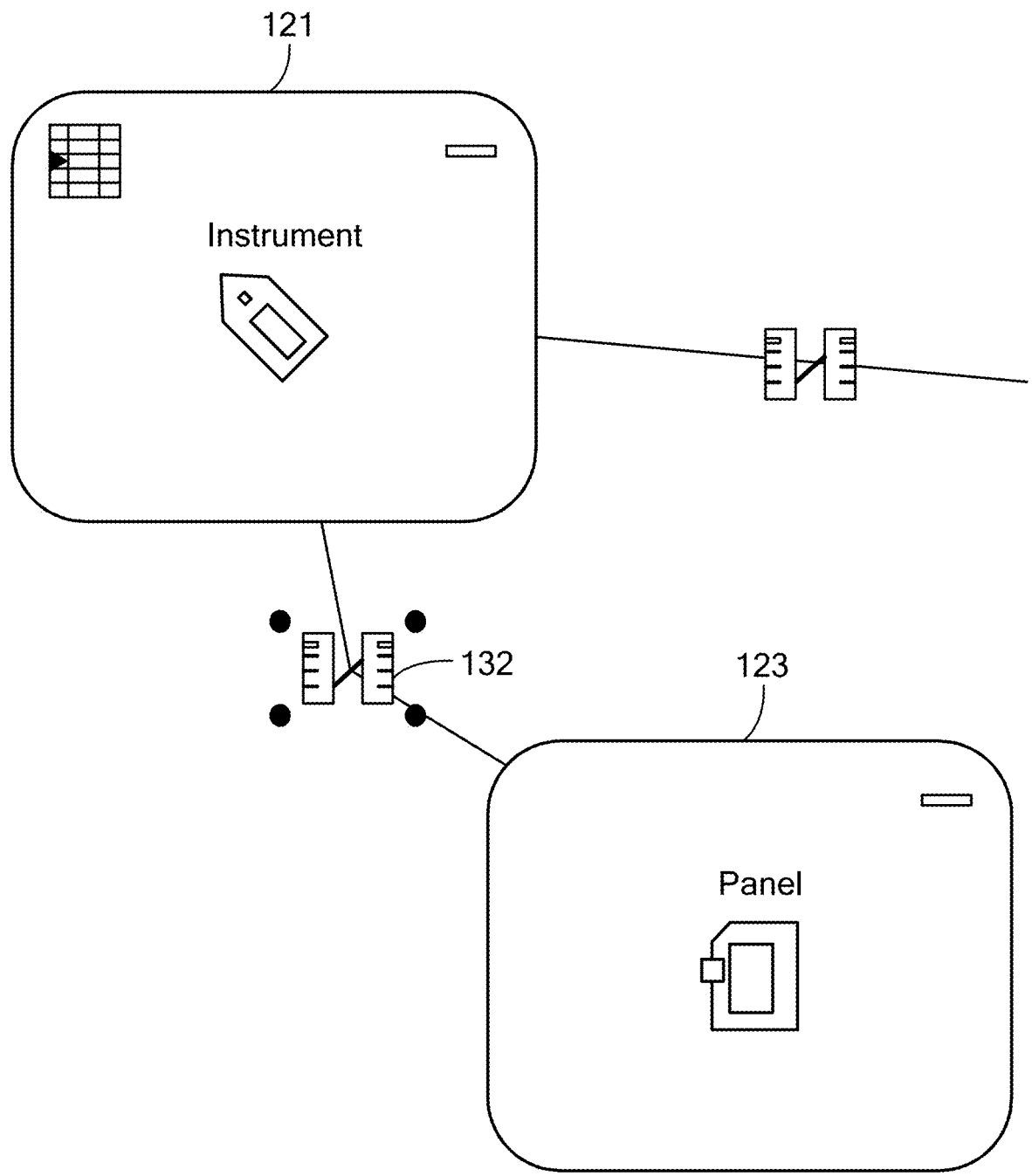

In operation, a graphical user interface module 310 displays, to a user, a canvas 101 on which the user may assemble a graphical database query, and a menu 110 of components. The user manipulates the mouse 204 to drag and drop two or more icons onto the canvas 101, where the icons are then displayed. In the examples of FIG. 1A and FIG. 1C, the user has placed icon 121 and icon 123 on the canvas 101. Icon 121 represents a component identified as "Instrument." As such, the graphical query reveals, to anyone who views it, that the query is designed to search the construction project database for a device characterized as an instrument.

The term "instrument" can, of course, represent a wide variety of devices. To make the query more specific, the user has also selected icon 123, identified as "Panel."

Step 502

Figure 1D:
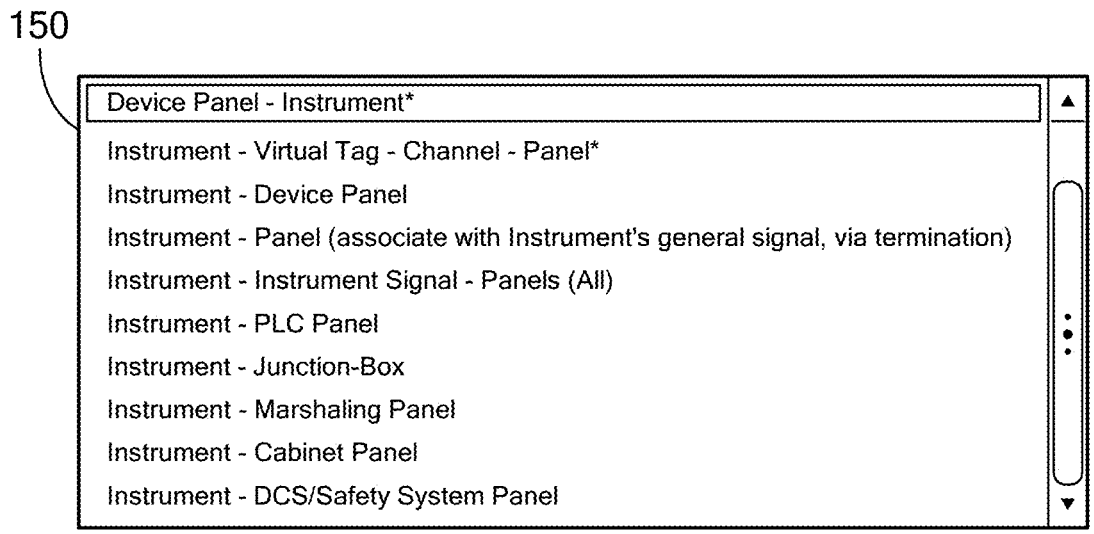

Upon selection of the second icon (in this case, icon 123), the graphical user interface module 310 automatically connects the two icons 121 and 123 by graphically displaying a connector 132. The graphical user interface module 310 also brings up a connector menu 150, as schematically illustrated in FIG. 1D. The graphical user interface module 310 has identified the icon 121 as "Instrument," and so the graphical user interface module 310 populates the connector menu 150 with connectors relevant to instruments. The user has selected a connector named "Device-Panel Instrument*," which is associated with the "Device-Panel Instrument*" field of the databases records, because the user knows that she needs to couple "Instrument" icon 121 to "Panel" icon 123. The graphical user interface module 310 graphically displays the connector "Device-Panel Instrument*" as item 132, which includes lines to indicate its relationship to and position between icon 121 and icon 123.

Figure 1E:
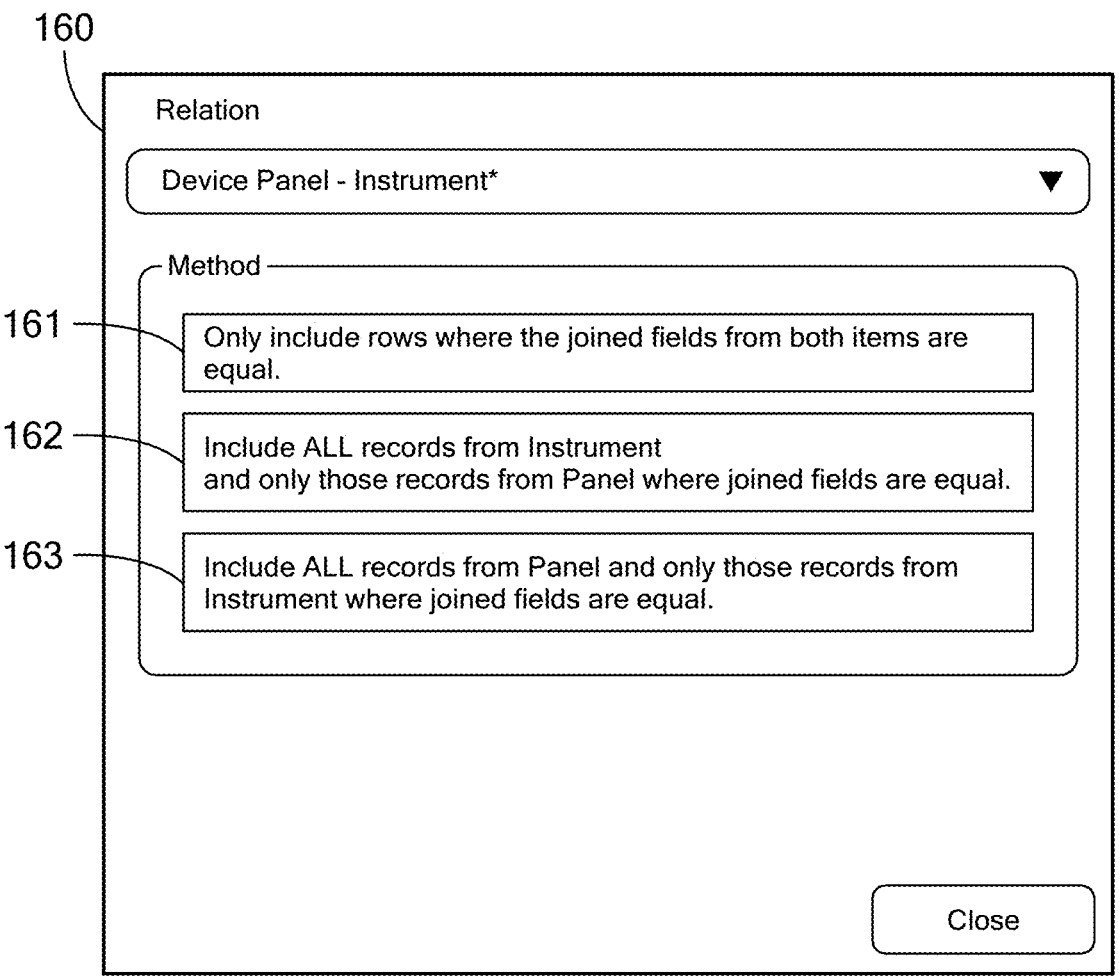
Figure 4:
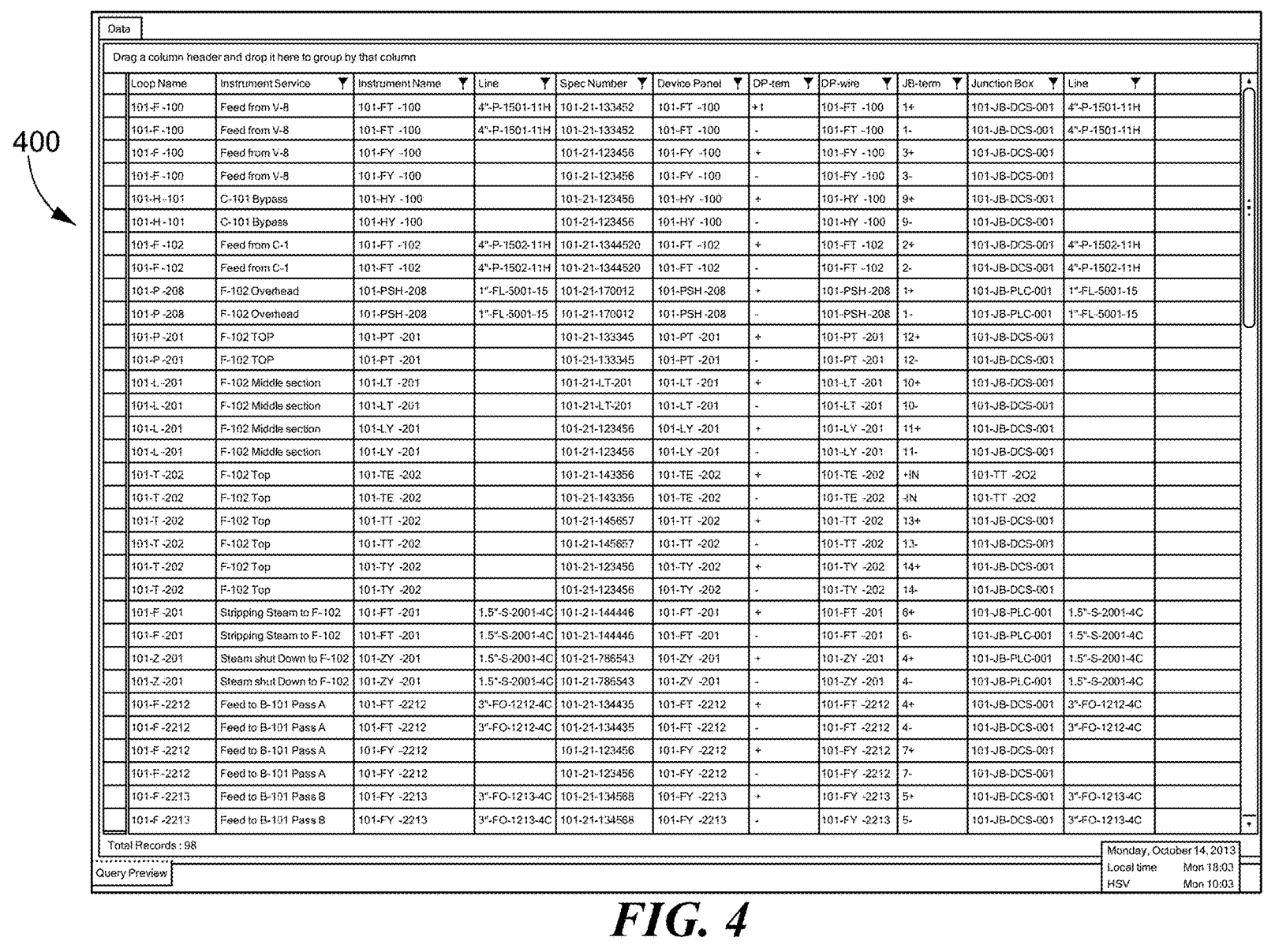

The graphical user interface module 310 then displays operation box 160, as schematically illustrated in FIG. 1E. Operation box 160 presents the user with options for configuring the "relation" illustrated by connector 132. In this example, operation box 160 presents the user with three options for defining the relation of connector 132. A first option 161 allows the user to require a database search to return all records in which the "Device-Panel Instrument*" field are identical (i.e., the instrument can interface to the panel). The second option 162 allows the user to require a database search to return all records for instruments, and only those records for panels in which the panel can interface with one of the instruments. The third option 163 allows the user to require a database search to return all records for panels, and only those instrument records where the instrument can interface with one of the panels. A sample report is schematically illustrated in FIG. 4.

The graphical user interface module 310 then displays the icons and the connectors so as to couple the icons into a tree configuration (e.g., query 120 in FIG. 1A). For example, in FIG. 1A, a graphical database query 120 is in the form of a tree that includes seven icons (121, 122, 123, 124, 125, 126, and 127) coupled by six connectors (131, 132, 133, 134, 135, and 136).

Step 503

Once a user creates the graphical database query 120 with the graphical user interface module 310, the translation module 320 translates the graphical database query into a query in a format consistent with the design of the database in the database module 330. For example, the graphical query of FIGS. 1C-1E might be translated to a text-based query as follows:

INST/All AND DP-I/match in which:

"INST" identifies a record field configured to store, in a record for an instrument, the name of the instrument;

"/All" is a parameter that indicates that the database search should identify and return all record that have data in the "INST" field;

"DP-I" as described above, identifies the record field configured to store, in a record for a panel, the type of instrument to which the panel can interface; and "/match" is a parameter that indicates that the database search should identify, for each panel record, the type of instrument to which the panel and interface, and return only those records in which that field (DP-I) matches the corresponding filed in the records of the instruments (i.e., "I-DP"), so as to indicate that the device can interface to an instrument returned by "INST/All."

In this example, the counterpart fields "DP-I" and "I-DP" may be referred to as "joined fields" and the query will return records only where the "joined fields" are equal—i.e., they indicate that each field indicates that its associated component can interface to the other component.

Note that the user was able to create this query without having to know that the database records contained the fields "INST" or "DP-I," and without having to know how to invoke those fields in a search or how to specify their parameters (e.g., "/All" and "/match"), and without having to know how to join those fields by use of the term "AND."

The translation module 320 can translate the graphical database query into any of a variety of formats. For example, the translation module 320 can translate the graphical database query into a format for input to a SQL database or a Microsoft Access database, to name but a few examples. Consequently, the interface module 310 may be considered platform agnostic, in that it allows a user to interface to any of a variety of databases without having to know anything about the underlying database.

Step 504 and Step 505

After the translation module 320 translates the graphical database query, the translated query is applied to the database module, and the database module returns a report of database records identified by the query. The system then displays the report 400 on the image display device, as schematically illustrated in FIG. 4, for example.

FIGS. 6-9 provide additional details regarding the functioning of the translation module in relationship to the underlying data in the database of the DBMS system using an associated data dictionary.

Figure 6:
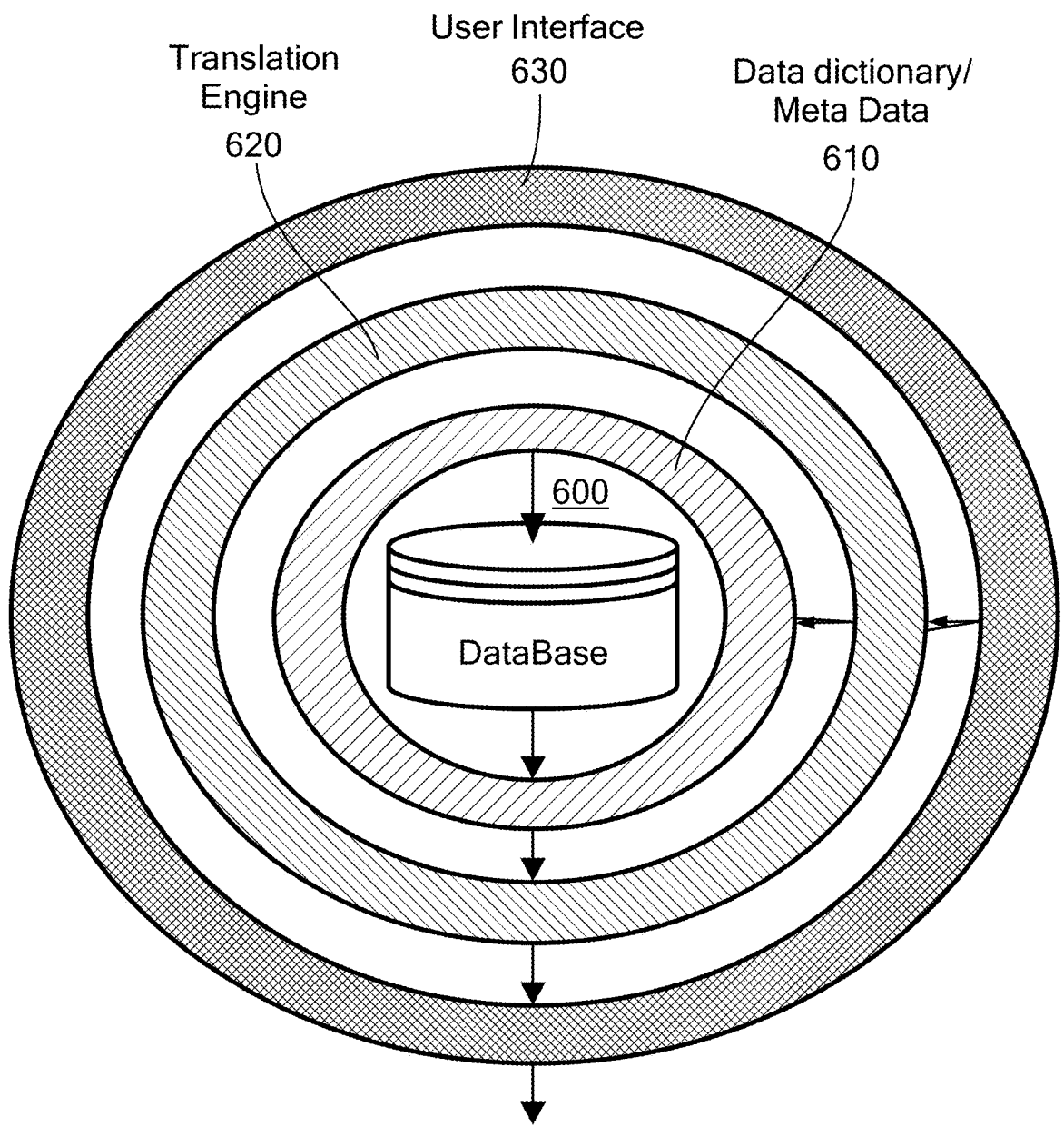
FIG. 6 graphically represents the hierarchy of the system automatic query generation system in accordance with an embodiment of the invention.

FIG. 6 graphically represents the hierarchy of the automatic query generation system in accordance with an embodiment of the invention. The hierarchical structure includes several layers between the underlying database from the database module and the user interface from the user interface module. Each layer represents a different form of abstraction from the most abstract at the graphical user interface level to the most concrete at the physical database level that includes the database tables and associated fields. This hierarchical structure allows the real-world items that are presented to the user in the graphical user interface to be mapped to the specific database tables, fields, and specific records. As shown in FIG. 6 the underlying database (i.e. the fields, tables, and relationships between fields and tables) is represented in a data dictionary 610 through a meta-data construction. Above the data dictionary is the translation module 620, which uses the meta-data construction in combination with the input from the user interface 630 to construct the query in a tree structure and to generate automatically a script in the appropriate DBMS syntax based upon the tree structure. It should be recognized that the tree structure is not essential to the present invention, rather the tree structure provides one way of showing the relationships between database tables, database fields, and the joining properties between database tables that represent the graphical query of the user. It should be recognized that other means (tables, linked lists etc.) can be used to represent the relationships presented by the tree structures in this application.

Figure 7:
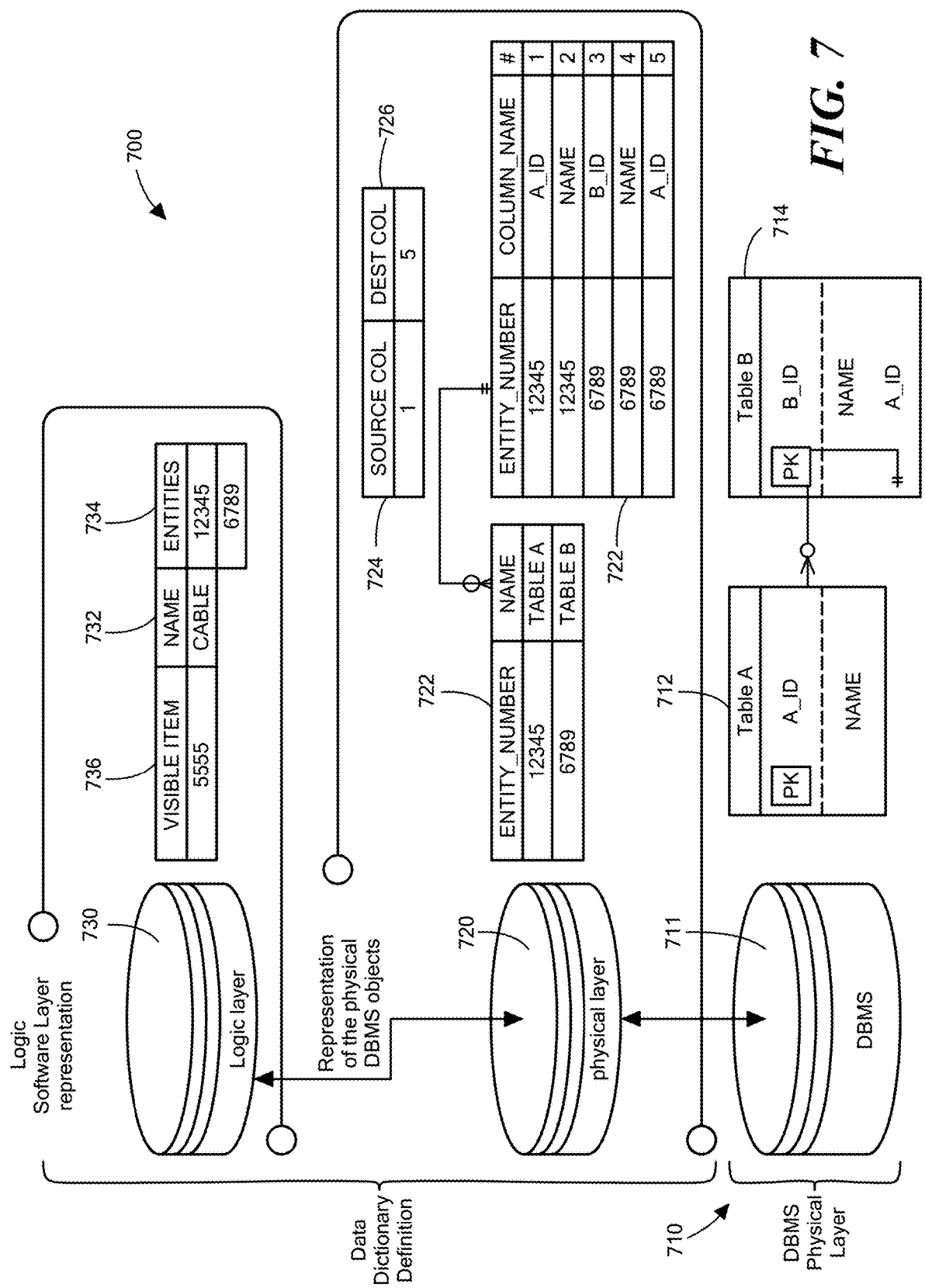
FIG. 7 is an exemplary representation of the data dictionary and its relationship to the underlying DBMS physical layer (e.g. database tables and fields).

FIG. 7 is an exemplary representation of the data dictionary 700 and its relationship to the underlying DBMS physical layer (e.g. database tables and fields) 710. The data dictionary 700 itself includes two representative layers: a physical layer 720 and a logic layer 730. The physical layer 720 relates the DBMS database tables 712, 714 to the corresponding dictionary definition 722 and the logic layer 730 relates the item 732 from the graphical user interface with the dictionary definition 734. It should be clear that the item that a user can select is an abstraction of the underlying database tables and fields, however the item represents a more complex object, which may be a real-world physical object in some embodiments.

As shown in FIG. 7, the exemplary DBMS database layer 710 includes two database tables (e.g. Table A and Table B) 712, 714 that include one or more elements. Table A 712 includes fields A_ID and Name. Table B 714 includes fields B_ID, Name, and A_ID. The physical layer 720 of the data dictionary 700 relates the Tables from the DBMS 711 database tables (e.g. A and B) 712, 714 with a corresponding entity number 722. Further, the physical layer 720 relates the entity numbers 722 with the corresponding Column_Name (i.e. fields) from the databases (e.g. entity_number is related to the database column name). Thus, the entity number 722 is a creation solely of the data dictionary and can be used to relate the database entries with the graphical user input entries (e.g. selected icons representative of items/components). As shown at the physical layer 720, the source col. 724 and the destination col. (foreign key) 726 are provided. As shown in the exemplary data dictionary 700, the source col. 1 (724) relates to the destination col. 5 (726) wherein the source col. is the entity_number and the destination_col. is also the entity number and represents the foreign key.

The graphical user input entries (e.g., the selected icons representing the logical object) are associated with the entity numbers at the logic level 730. The graphical user input entries are identified by a field (e.g. visible item number) 736 along with a user identifier (e.g. name) 732. As shown, the graphical user input entry for the name "cable" is associated with visible item number 5555. This visible item number can be matched to the graphical user interface elements. The graphical user interface item for a cable (logical item) can be represented as a graphical icon or line of text that can be selected and dragged and dropped as a graphical icon within a query workspace. The graphical user interface item is associated with a visible number along with an identifier such as "cable". Thus, the name identifier "cable" would appear in the graphical user interface and would be selectable by a user as a logical object. The graphical icon for "cable" would be associated with the visible item number. The transaction engine can then make use of the associations provided within the data dictionary to create an automated script for the query by first building a query structure of the relationships, so as to maintain the hierarchical relationships between database tables based on the selected properties for a given logical object.

Figure 8:
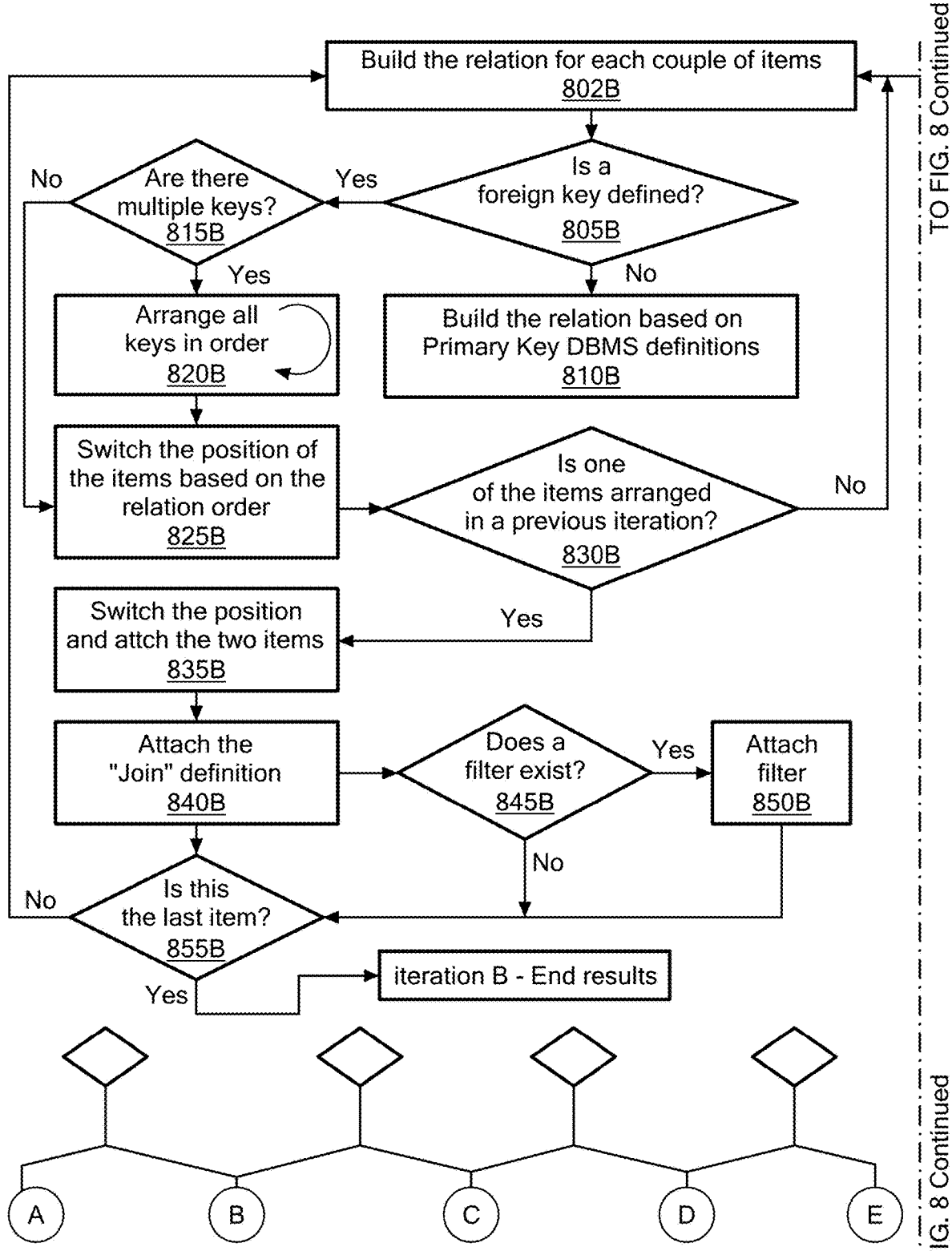
FIG. 8 is a flow chart that represents the internal logic of the translation module in accordance with one embodiment of the invention where the flow chart includes a first iterative loop (iteration A) and a second iterative loop (iteration B).
Figure 8:
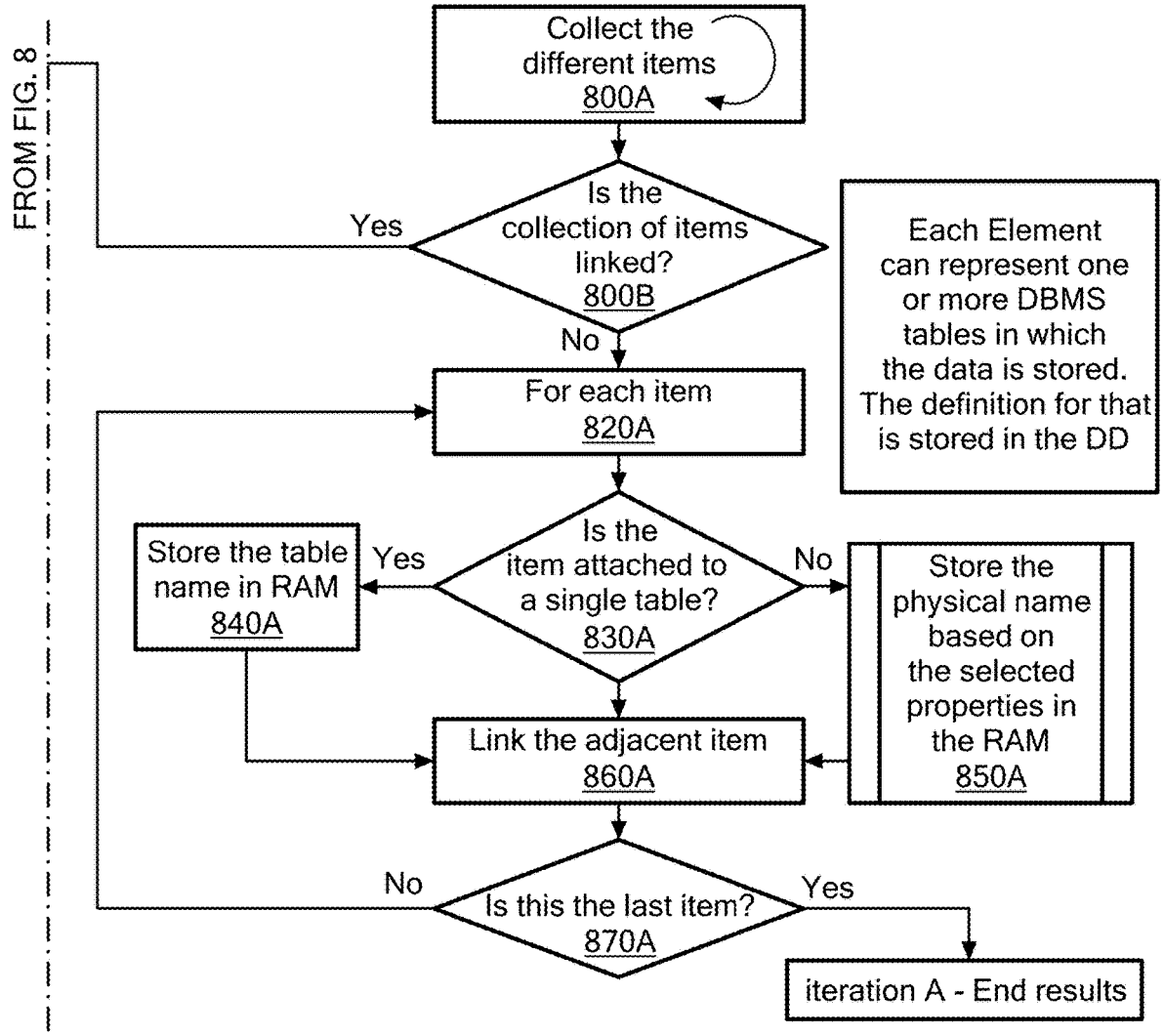
Figure 8:
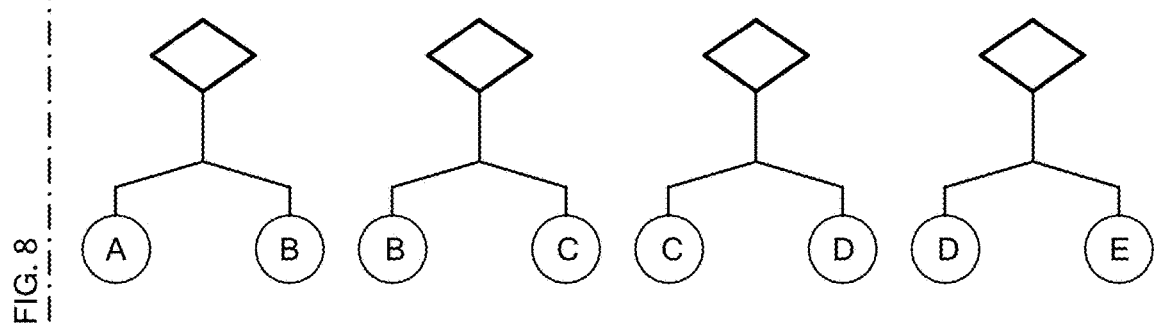
Figure 8:
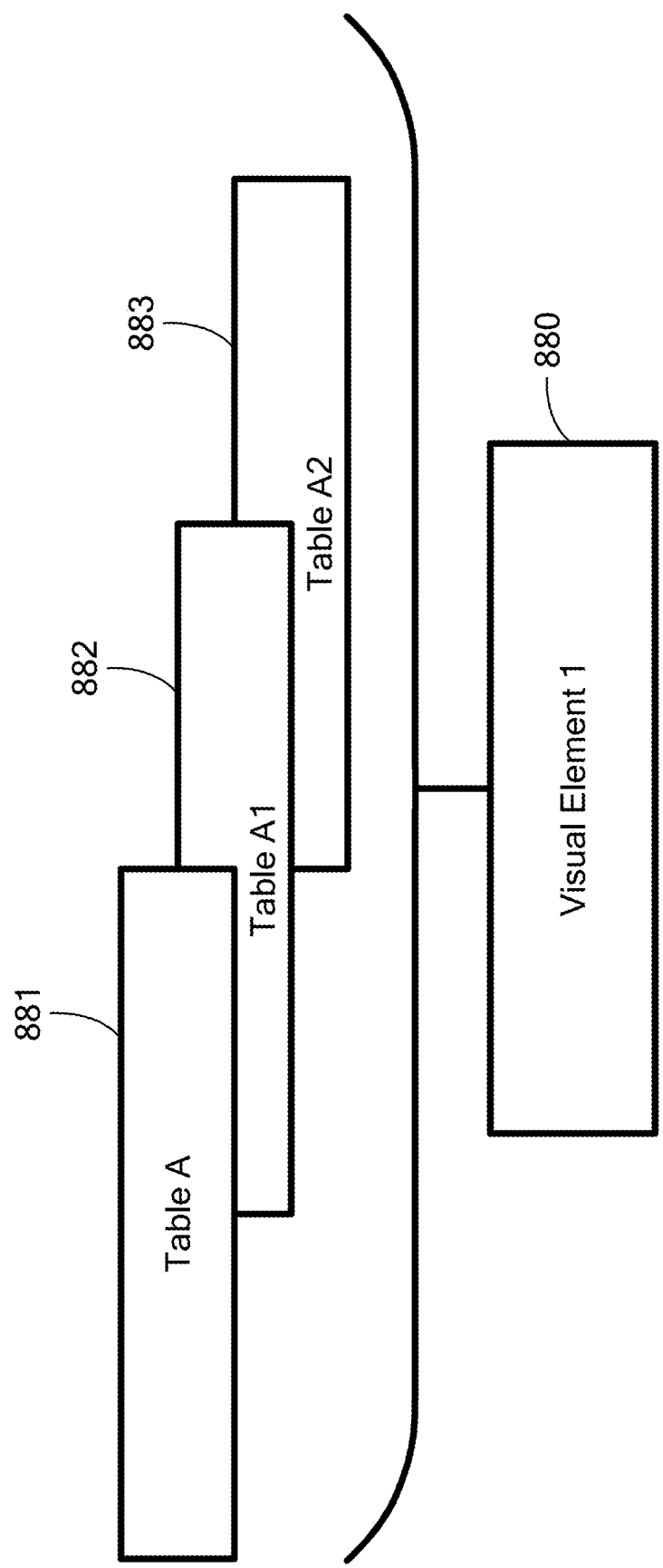

In one embodiment the translation module operates according to the flow chart of FIG. 8, the translation module receives from the user interface a listing of different items (e.g. logical objects that are abstractions of one or more database elements) that are within the work space and translates the listing of different items and the interconnections between items into a binary tree relationship of the underlying database tables, keys and hierarchical relationship between the tables providing a representation of a database query. Once the database query has a representative format, the database query can easily by translated into the syntax of one or more DBMS systems.

The translation module begins with the receipt of a first item as designated in the graphical workspace 800A and proceeds with iteration A, which is the right side of the flow chart of FIG. 8. The process of iteration A continues until all of the items (e.g. logical objects) 820A are identified The translation module first checks the data dictionary to see if the item (e.g. an engineering element of the system) is associated with a single table within the database 830A. This is accomplished by checking the relationships within the data dictionary at the physical layer. If the answer is "yes" and there is only a single table associated with the item, the table name and the item are associated and stored in memory (e.g. RAM) 840A. It should be recognized by one of ordinary skill in the art that the selected item (logical object) in the graphical workspace may be a logical abstraction of the underlying databases and therefore, the greater the degree of abstraction (i.e. the complexity of the logical object) the more database tables the item will be related to. For example, a complicated structure such as an automobile will be formed from many different parts wherein each of the parts are related to other parts and the parts may have one or more identified properties.

If the answer is "no" and the item is associated with more than one table, then the physical name from the underlying database is stored based upon the selected properties for that item as indicated by user selection in the graphical workspace. 850A Stated differently, if the selected item is associated with more than 1 table, a determination needs to be made concerning which table to use for the final DBMS query, which may take the form of a DBMS script. This can be accomplished by identifying if the user creating the query has selected properties for one or more of the items. For example, item A may be based on a plurality of tables: table1 and table2 where table1 includes Col1, Col2 and table2 includes ColA, ColB. If the user chooses to query the selected property represented by ColB for this logic item (item A) then the final query must use table 2 and not table1. FIG. 8 also shows an embodiment when there is more than one table 881, 882, 883 associated with a selected element 880.

The methodology proceeds by linking the item to an adjacent item 860A until there are no more items to link. 870A The end of iteration A results in a query structure, such as tree structure as shown wherein the items are each represented by the underlying DBMS database table identifier and the DBMS identifiers are linked together.

In iteration B, which is the left side of the flow chart of FIG. 8, the translation module first determines if iteration A was successful and all the couples of DBMS identifiers are linked and stored in a collection within memory (e.g. RAM) 800B. If the items are linked together, the translation module builds the relationship for each couple based upon the graphical relationship from the workspace. 802B The translation module queries if the foreign key(s) are defined that establish the relationship between the DBMS identifiers (parent/child relationship). 805B If the foreign key(s) are not defined then the translation module builds the relationship based on the primary key DBMS definitions that are part of the DBMS system. 810B These relationship are part of the DBMS primary keys that are defined during the creation of the linkage between the DBMS system and the underlying database(s). If the foreign key is defined and found within the data dictionary, the translation module checks to see if there are multiple keys for multiple database tables in a hierarchical relationship. 815B For example, if the answer is "yes" then there are multiple foreign keys, the keys are arranged in order. Ordering is performed based upon parent/child database relationships between tables as defined in the data dictionary. 820B For example, a parent/child relationship (P/C) is represented by the source and destination table within the data dictionary (source col.=parent, destination col.=child). The keys are ordered so that for each of the relationships there is P/C, P/C relationship. For example, an item, such as a "cable" may have a "wire type" and the "wire type" may have a "type of connector" wherein each of these relationships cable/wire-type and wire-type/connector are located in two tables of the database. Thus, the database key relationship that relates the (cable/wire-type) would come before the database key relationship (wire-type/connector) if the query is looking for cables having a spade connector. The translation module switches the position of the items (i.e. the components) based on the proper relationship order. 825B

The translation module then checks to see if one of the items of the couple was part of a previous iteration. 830B If the answer is "no", the translation module returns to build another relationship for another couple of items (e.g. logical objects defined by their underlying DBMS identifiers) and continues with this process until all couples have been processed. The end result is a query structure, which is a relationship between database tables, the keys between databases and the join command between database tables. As shown in FIG. 8, these relationships may be represented by a tree structure. The tree structure is a representation of the "nested set model", which is a technique for representing nested sets (also known as trees or hierarchies) in relational databases.

If the answer is "yes" and one of the items was part of a previous iteration, then the position of the items is switched and the two items are attached. 835B For example, if item 1 is linked to item 2, but the relation definitions at the DBMS database level is that the parent item is item 2 and the child item is item 1, the position of the items is switched such that item 2 is linked to item 1. This provides the proper relationship for building the actual query in the syntax of the DBMS at the DBMS physical layer. Once the position is switched and the items are attached the items are then joined together. 840B The term joined should be understood in its normal context in the database arts. For example, an SQL join command is used to combine rows from two or more tables, based on a common field between them. Thus, the database tables can be substituted for the logical objects in the query structure.

The translation module inquires if there is a filter for the "join" connection (e.g. left join, right join, inner join etc.). 845B If there is a filter, the filter is associated with the two database tables that have been joined together (e.g. SQL INNER JOIN( ) which returns all rows from multiple tables where the join condition is met). 850B This process continues on until the last item from the query is processed and the corresponding database tables are joined together. 855B The filter that is applied for joining elements together can best be seen in FIG. 1E (161-163). In this figure, three types of relationships are shown:

1. Display all records from item type Y and all records from item type X which have a relation to item type Y (e.g. SQL INNER JOIN). This filter results in the display of all the rows where each side of the relationship has data. (In certain embodiments, this would be the default filter).
2. Display all records from item type Y and only those records from item type X, thus this filter results in the display of all the records from row item type X even if there is no relationship to row type Y, but only displays records from row Y that have a relationship with row X.
3. Display all record(s) from item type X and only those item type Y items, which are related. The result of this filter would display all the records from row Y even if there is no relationship to row X, but only displays records from row X that have a relationship with row Y.

Once the filter is attached to the joined items, and all of the items have been processed through iteration B, the process ends with a query structure of the graphical query. The query structure may be a tree structure that relates the DBMS physical layers and keys together in an order that will result in the desired user query for the joined logical objects.

Figure 9:
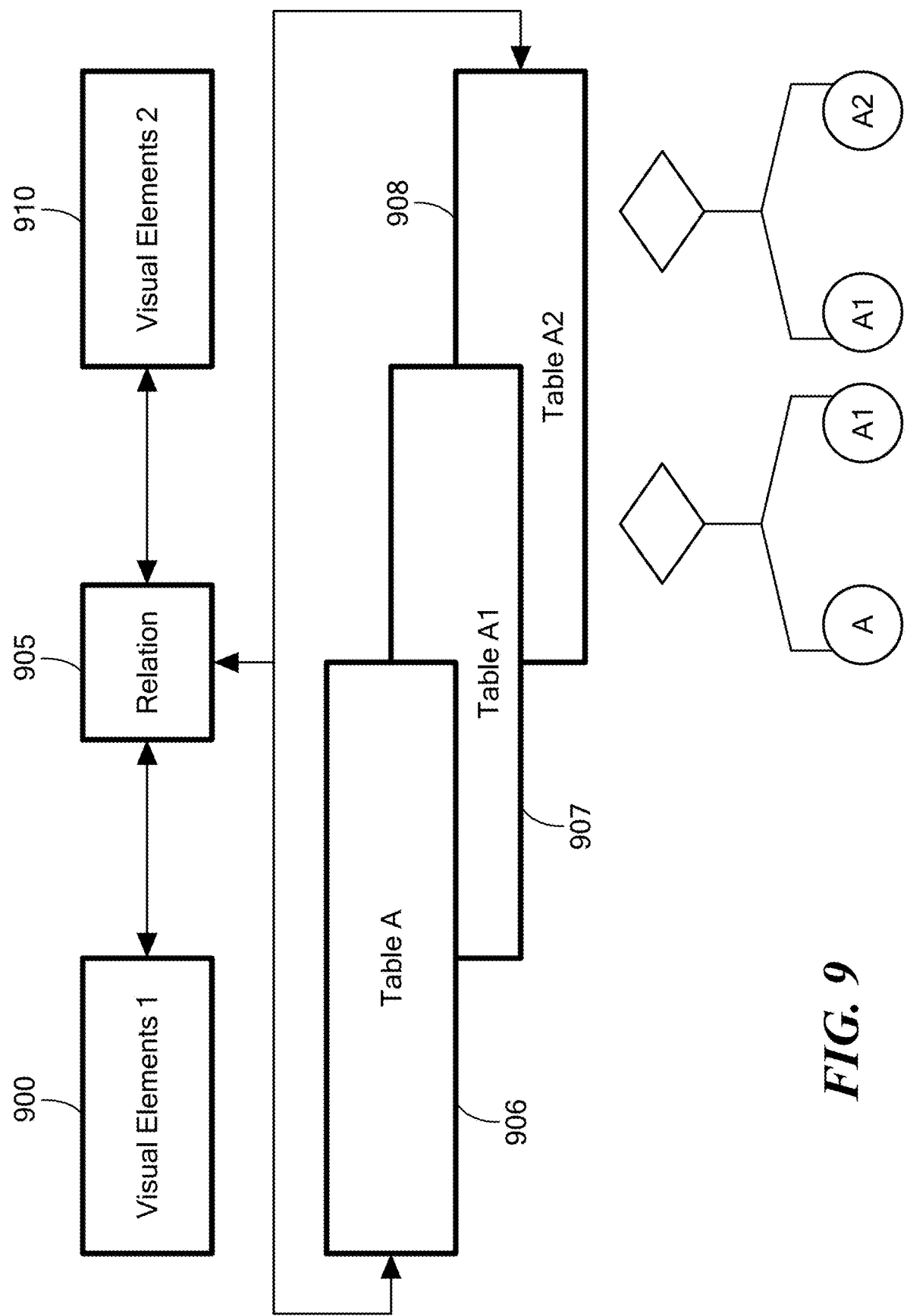
FIG. 9 is a graphical example showing the relationship of items from the graphical user interface that are joined together with the underlying structures from the data dictionary that result in the tree structure as the output of the translation module using, for example, the flow chart of FIG. 8.

A graphical example of the process of FIG. 8 is shown in FIG. 9. Visual element 1 (900) and visual element 2 (910) form a couple and have a relationship 905. There are multiple keys for visual elements 1 and visual elements 2. Thus, these visual elements (items) are associated through the data dictionary with Table A2 (908), Table A (906) and Table A1 (907). The order of the DBMS database keys is reordered so that Table A is the parent of Table A1 and Table A1 is the parent of Table A2 in accordance with iteration B from FIG. 8. Thus, the resultant tree structure shows that Table A (906) is searched for an element in Table A1 (907) and the identified element in Table A1 is used to search for another element in table A2 (908).

Figure 9A:
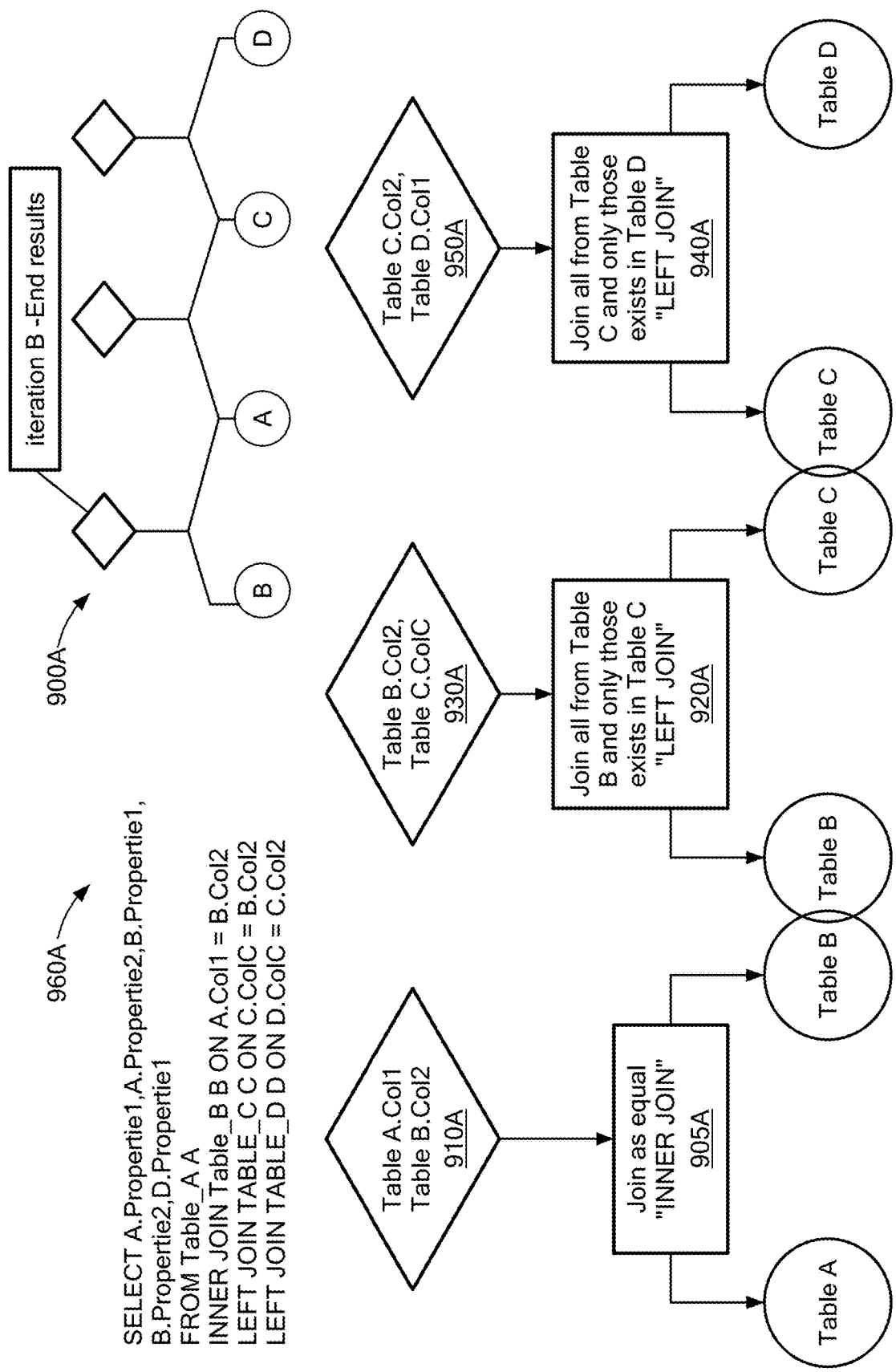
FIG. 9A graphically shows the process of converting the tree structure output of the translation module into a database query in a script format.

FIG. 9A graphically shows the process of converting the tree structure output of the translation module into a database query in a script format. As shown at the end of iteration B in FIG. 8 and at the top of FIG. 9A, a tree structure 900A is built that shows that Table A is joined to Table B; Table B is joined to Table C; and Table C is joined to Table D. Starting with this tree structure and the relationship between Tables, the tree structure can be filled in as a result of the data dictionary. As shown, an inner join 905A relates Table A to Table B and Col. 1 of Table A is related to Col. 2 of Table B 910A. Additionally, Table B is "Left Joined" with Table C 920A wherein Table B col. 2 is related to Table C. Col. C 930A. Finally, there is a "left join" between Table C and Table D 940A wherein Table C col. 2 and Table D col. 1 are related together 950A. From this tree structure, a script 960A can automatically be generated as shown having standard SQL properties. This database query (script) can then be provided to a DBMS in order to generate the results of the database query.

It should be recognized by one of ordinary skill in the art that a tree structure need not be generated in order to generate the final database query using the DBMS syntax. What is important is the sequence of the database tables to be searched, the associated keys between fields of the tables, and the manner in which the tables are joined. With this information, the query/script can be created in the specified DBMS syntax. The resulting script 960A uses the information from the tree structure and places the information into the proper syntax.

FIG. 10 provides a more complex exemplary script that is generated from a tree structure as the result of the processes of the flow chart of FIG. 8 when employed with a more complex graphical query (not shown).

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink-wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for automatically constructing a database query that can be used for querying different database management systems, each database management system having a different query syntax, the method performed by a graphical database system including at least one processor coupled to at least one memory containing instructions which, when executed by the at least one processor, causes the graphical database system to perform the method comprising:
    maintaining, in at least one memory, a data dictionary including meta-data that relates each of a plurality of logical objects with one or more corresponding database tables and keys;
    providing a user interface allowing a user to select logical objects and properties of logical objects and to join two or more logical objects together using predefined joining logic within a graphical computer workspace to form a graphical query;
    receiving a listing of the selected logical objects, the selected properties of the logical objects, and a representation of the joining logic between logical objects from the graphical query;
    translating, using the data dictionary meta-data, the listing of the selected logical objects, the selected properties of the logical objects, and the representation of the joining logic into a tree structure of the underlying database tables, keys, and hierarchical relationship between the tables to produce, in the at least one memory, a representation of a database query that is agnostic of any of the different database management system query syntaxes and that can be translated into different query syntaxes for different database management systems; and
    storing the agnostic database query in the at least one memory for later recall and translation into the query syntax of a selected database management system.

2. The method of claim 1, wherein the data dictionary includes a plurality of levels including a physical level and a logical level, wherein the physical level associates database structures with a data dictionary structure and the logical level associates the data dictionary structure with logical objects that can be graphically selected by a user.

3. The method of claim 1, further comprising:
translating the agnostic database query into the query syntax of a selected database management system.

4. The method of claim 3, wherein the query syntax uses structured query language.

5. A graphical database system for automatically constructing a database query that can be used for querying different database management systems, each database management system having a different query syntax, the graphical database system comprising:
at least one processor coupled to at least one memory containing instructions which, when executed by the at least one processor, causes the graphical database system to perform computer processes comprising:
maintaining, in at least one memory, a data dictionary including meta-data that relates each of a plurality of logical objects with one or more corresponding database tables and keys;
providing a user interface allowing a user to select logical objects and properties of logical objects and to join two or more logical objects together using predefined joining logic within a graphical computer workspace to form a graphical query;
receiving a listing of the selected logical objects, the selected properties of the logical objects, and a representation of the joining logic between logical objects from the graphical query;
translating, using the data dictionary meta-data, the listing of the selected logical objects, the selected properties of the logical objects, and the representation of the joining logic into a tree structure of the underlying database tables, keys, and hierarchical relationship between the tables to produce, in the at least one memory, a representation of a database query that is agnostic of any of the different database management system query syntaxes and that can be translated into different query syntaxes for different database management systems; and
storing the agnostic database query in the at least one memory for later recall and translation into the query syntax of a selected database management system.

6. The system of claim 5, wherein the data dictionary includes a plurality of levels including a physical level and a logical level, wherein the physical level associates database structures with a data dictionary structure and the logical level associates the data dictionary structure with logical objects that can be graphically selected by a user.

7. The system of claim 5, wherein the computer processes further comprise:
translating the agnostic database query into the query syntax of a selected database management system.

8. The system of claim 7, wherein the query syntax uses structured query language.

9. A computer program product comprising a tangible, non-transitory computer readable medium having embodied therein computer program instructions which, when executed by one or more processors of a graphical database system, causes the graphical database system to perform computer processes comprising:
maintaining, in at least one memory, a data dictionary including meta-data that relates each of a plurality of logical objects with one or more corresponding database tables and keys;
providing a user interface allowing a user to select logical objects and properties of logical objects and to join two or more logical objects together using predefined joining logic within a graphical computer workspace to form a graphical query;
receiving a listing of the selected logical objects, the selected properties of the logical objects, and a representation of the joining logic between logical objects from the graphical query;
translating, using the data dictionary meta-data, the listing of the selected logical objects, the selected properties of the logical objects, and the representation of the joining logic into a tree structure of the underlying database tables, keys, and hierarchical relationship between the tables to produce, in the at least one memory, a representation of a database query that is agnostic of any of the different database management system query syntaxes and that can be translated into different query syntaxes for different database management systems; and
storing the agnostic database query in the at least one memory for later recall and translation into the query syntax of a selected database management system.

10. The computer program product of claim 9, wherein the data dictionary includes a plurality of levels including a physical level and a logical level, wherein the physical level associates database structures with a data dictionary structure and the logical level associates the data dictionary structure with logical objects that can be graphically selected by a user.

11. The computer program product of claim 9, wherein the computer processes further comprise:
translating the agnostic database query into the query syntax of a selected database management system.

12. The computer program product of claim 11, wherein the query syntax uses structured query language.

* * * * *